US010298589B2

(12) United States Patent
Cleaver et al.

(10) Patent No.: US 10,298,589 B2
(45) Date of Patent: May 21, 2019

(54) USER ABSTRACTED RBAC IN A MULTI TENANT ENVIRONMENT

(71) Applicant: INTERNATIONAL BUSINESS MACHINES CORPORATION, Armonk, NY (US)

(72) Inventors: James D. Cleaver, Grose Wold (AU); Michael J. McGuire, Beaumont Hills (AU)

(73) Assignee: International Business Machines Corporation, Armonk, NY (US)

(*) Notice: Subject to any disclaimer, the term of this patent is extended or adjusted under 35 U.S.C. 154(b) by 156 days.

(21) Appl. No.: 15/007,556

(22) Filed: Jan. 27, 2016

(65) Prior Publication Data
US 2017/0214696 A1 Jul. 27, 2017

(51) Int. Cl.
H04L 29/06 (2006.01)

(52) U.S. Cl.
CPC .......... H04L 63/102 (2013.01); H04L 63/104 (2013.01)

(58) Field of Classification Search
CPC .............................. H04L 63/102; H04L 67/10
See application file for complete search history.

(56) References Cited

U.S. PATENT DOCUMENTS

| 8,850,528 | B2 | 9/2014 | Van Biljon et al. |
| 9,544,289 | B2 | 1/2017 | Ishaya et al. |
| 9,794,110 | B2 | 10/2017 | Kraus et al. |
| 10,063,537 | B2 | 8/2018 | Zhu et al. |
| 2011/0321154 | A1* | 12/2011 | Dau ..................... G06F 21/6218 726/17 |
| 2012/0102080 | A1* | 4/2012 | Kirihata ................ G06F 21/604 707/831 |
| 2012/0233668 | A1* | 9/2012 | Leafe .................. G06F 9/44526 726/4 |

(Continued)

OTHER PUBLICATIONS

Bo Tang et al., "A Multi-Tenant RBAC Model for Collaborative Cloud Services," 2013 Eleventh Annual Conference on Privacy, Security and Trust (PST), 2013 IEEE, pp. 229-238.*

(Continued)

Primary Examiner — Luu T Pham
Assistant Examiner — Canh Le
(74) Attorney, Agent, or Firm — Schmeiser, Olsen & Watts, LLP

(57) ABSTRACT

Role based access control (RBAC) identity management tools, computing systems, computer products and methods of abstracting individual users from the role assignment and revalidation process of traditional RBAC. The RBAC tools, products and systems of the present disclosure organize and manage multi-tenanted networks and cloud computing environments by organizing individual users by service providers having a single or unified identity, which are separately managed by the service provider owners. The service provider identities are treated as a single service provider entity applying for one or more roles in the multi-tenant system, allowing for a simplified role revalidation that no longer requires managers of tenants in a multi-tenant network to approve the role assignment of each individual user, because the tenants and tenant managers are unaware of the users identities that make up the service provider identity.

17 Claims, 7 Drawing Sheets

(56) References Cited

U.S. PATENT DOCUMENTS

| | | | |
|---|---|---|---|
| 2013/0283350 A1* | 10/2013 | Afek | G06F 21/6218 |
| | | | 726/4 |
| 2014/0108474 A1* | 4/2014 | David | G06F 17/30 |
| | | | 707/827 |
| 2014/0150066 A1* | 5/2014 | Chandolu | G06F 21/6218 |
| | | | 726/4 |
| 2014/0196115 A1* | 7/2014 | Pelykh | H04L 63/08 |
| | | | 726/4 |
| 2014/0215604 A1* | 7/2014 | Giblin | G06F 11/328 |
| | | | 726/21 |
| 2015/0350194 A1 | 12/2015 | Gilpin et al. | |

OTHER PUBLICATIONS

Canh Ngo et al., "Multi-tenant attribute-based access control for cloud infrastructure services," Journal of Information security and application 27-28, 2016, pp. 65-84.*

Dancheng Li et al., "RBAC-based Access Control for SaaS Systems," IEEE 2010, pp. 1-4.*

Tang, Bo et al.; A Multi-Tenant RBAC Model for Collaborative Cloud Services; Eleventh Annual International Conference on Privacy, Security and Trust; Jul. 10-12, 2013; pp. 229-238.

Li, Qi et al.; Towards secure dynamic collaborations with group-based RBAC model; Computers & Security, vol. 28, Issue 5; Jul. 2009; pp. 260-275.

Paquette, Jason; Allow use of Public Groups from Validation Rules; URL: https://success.salesforce.com/ideaView?id=08730000000aGuUaaU; Retrieved from the Internet Aug. 3, 2015; 4 pages.

* cited by examiner

USER ABSTRACTED RBAC IN A MULTI TENANT ENVIRONMENT

TECHNICAL FIELD

The present disclosure relates generally to computers, digital computing, or data processing systems, including identity management systems using role based access control (RBAC) models.

BACKGROUND

Role-based access control (RBAC) is a computer security method of regulating access to a computer system or computer network resources. RBAC restricts access to the computing resources to users that are authorized to access the resources. Individual users of the computing system or networking resources apply for specific roles, which are granted permissions to access specific resources available on the computer system or network. Roles are often defined according to the individual user's job, authority or responsibility within an organization or enterprise.

Roles within an organization are created for various job functions. Each role is granted permissions to perform certain operations on the computing system or network assigned to the particular role. RBAC security systems differ from individual user based security systems because RBAC systems do not assign permissions direct to a user, instead users acquire them through their assigned role. This differs from individual user based security that assigns users permissions on an individual object-by-object basis. Assignment and management of individual user rights can offer simplification of common operations, including adding a user or changing a user's department. Roles assigned to the user can easily be created, changed, or discontinued without having to individually update the privileges of every user of the system. Instead, when users change positions, or job requirements shift, roles may be added or modified to compensate for the new responsibilities of a user.

While RBAC security systems are advantageous under certain enterprise systems, RBAC suffers from its impracticability of scaling for use in large multi-tenanted or cloud based computing systems or networks. It is not feasible to create a role for every customer or tenant of a multi-tenant system, or manage every user's individual authorizations for each of the users' roles. It not uncommon for multi-tenanted or cloud based systems to manage hundreds of thousands of role assignments. Validating and managing every individual user that requests a role in the multi-tenant or cloud based environment, would require excessive amounts of resources to manage. Therefore, a need exists for methods, computer systems and computer programming products, capable of simplifying management requirements of individual users in RBAC systems.

SUMMARY

A first embodiment of the present disclosure provides a method for abstracting individual users from a role based access control (RBAC) identity management system, said method comprising the steps of: assigning, by a computer processor of the identity management system, each of the individual users to a service provider identity dataset as a function of a service provider identity owner's input data instructing the computer processor to assign each of the individual users to the service provider identity dataset; requesting, by the computer processor, addition of the service provider identity dataset to a role dataset, wherein the role dataset includes permissions to access a secured resource of the identity management system; granting, by the computer processor, the addition of the service provider identity dataset to the role dataset, as a function of input data from a tenant manager instructing the computer processor to add the service provider identity dataset to the role dataset; and periodically revalidating, by the computer processor, the addition of the service provider identity dataset to the role dataset, wherein the input data of the tenant manager instructs the computer processor to maintain or delete the service provider identity dataset from the role dataset.

A second embodiment of the present disclosure provides a computer program product, comprising one or more computer readable hardware storage devices having computer readable program code stored therein, said program code containing instructions executable by the one or more computer processors to implement a method for abstracting one or more individual users from a role based access control identity management system, said method comprising the steps of: assigning, by the computer processor, each of the individual users to a service provider identity dataset as a function of a service provider identity owner's input data instructing the computer processor to assign each of the individual users to the service provider identity dataset; requesting, by the computer processor, addition of the service provider identity dataset to a role dataset, wherein the role dataset includes permissions to access a secured resource of the identity management system; granting, by the computer processor, the addition of the service provider identity dataset to the role dataset, as a function of input data from a tenant manager instructing the computer processor to add the service provider identity dataset to the role dataset; and periodically revalidating, by the computer processor, the addition of the service provider identity dataset to the role dataset, wherein the input data of the tenant manager instructs the computer processor to maintain or delete the service provider identity dataset from the role dataset.

A third embodiment of the present disclosure provides a computer system, comprising one or more processors, one or more memories coupled to the one or more computer processors, and one or more computer readable storage devices coupled to the one or more processors, said one or more storage devices containing program code executable by the one or more processors via one or more memories to implement a method for abstracting one or more individual users from a role based access control identity management system, said method comprising the steps of: assigning, by a computer processor of the identity management system, each of the individual users to a service provider identity dataset as a function of a service provider identity owner's input data instructing the computer processor to assign each of the individual users to the service provider identity dataset; requesting, by the computer processor, addition of the service provider identity dataset to a role dataset, wherein the role dataset includes permissions to access a secured resource of the identity management system; granting, by the computer processor, the addition of the service provider identity dataset to the role dataset, as a function of input data from a tenant manager instructing the computer processor to add the service provider identity dataset to the role dataset; and periodically revalidating, by the computer processor, the addition of the service provider identity dataset to the role dataset, wherein the input data of the tenant manager instructs the computer processor to maintain or delete the service provider identity dataset from the role dataset.

DETAILED DESCRIPTION

Figure 1:
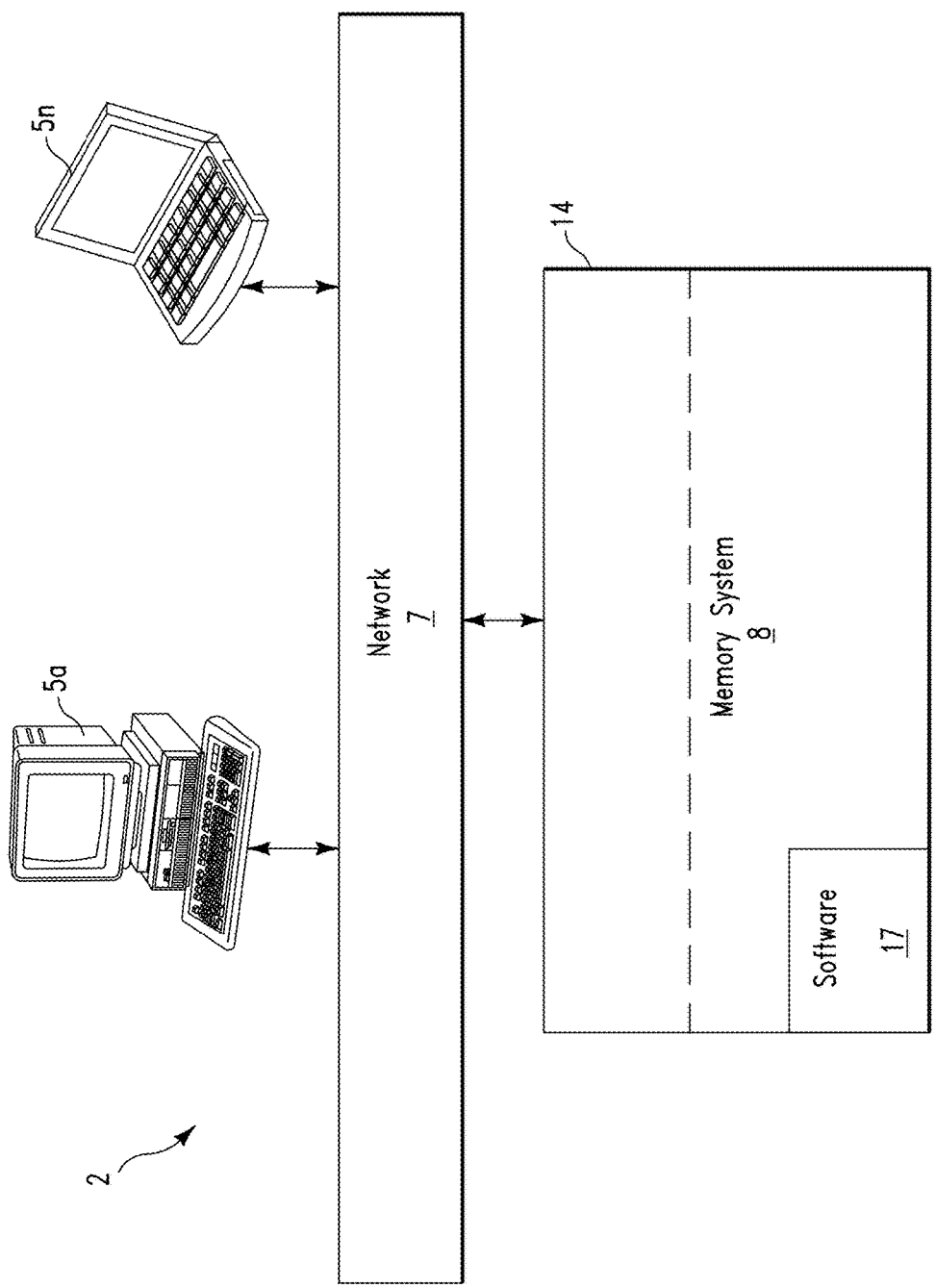
FIG. 1 depicts an embodiment of a computing network for implementing embodiments of the present invention.

Embodiments of the present invention enable RBAC identity management tools and methods for abstracting individual users from the role based membership and authorization processes associated with identity management systems utilizing RBAC programs. More specifically, the RBAC identity management tools and methods described herein offer scalable computing solutions for multi-tenanted service provider models, such as those models found in a cloud computing environment.

Under traditional RBAC identity management tools and methods, each individual user applies for membership to roles, and upon receipt of the application for the role, a role owner authorizes the user's membership on an individual basis. The permissions associated with the role are assigned directly to the user which allows that user to access any of the resources associated with the role. Periodically, under traditional RBAC identity management tools, systems and methods, the role owner will re-evaluate all of the users assigned to each role, in order to ensure that the assignment is correct or that the user should still have access to the computing system protected by the RBAC identity management tools and methods. However, these traditional RBAC identity management tools and methods do not feasibly scale well when applied to multi-tenanted models having multiple providers. The process of creating one or more roles per customer or tenant of the multi-tenanted model, and then having individual users apply for each appropriate role would lead to hundreds of thousands of individual users being managed by the role owner. This may be especially difficult and inefficient for the role owner during the periodic revalidations that may take place on a regular or semi-regular basis. A role owner will more than likely be overwhelmed by the number of revalidations that need to occur and furthermore, may not be intimately be familiar with the details of every individual user of the hundreds of thousands of users having access to the role owner's systems and resources on a multi-tenanted system model.

Embodiments of the RBAC identity management tool and methods of the present invention enables parties to organize and manage multi-tenanted computing systems much more efficiently by abstracting the individual users from the role application and revalidation process, used by traditional RBAC identity management tools and methods. Instead, of individual applications by each user directly to each customer or tenant in a multi-tenant model, users may be organized into a service provider identity, which may be a collection of users and/or user groups which do not have any visibility to individual tenants or managers of tenants. Subsequently, the service provider's identity is treated as the individual being authorized and the service provider as a unified identity may apply for one or more roles in the multi-tenant system to one or more customers or tenants, without the tenant having any visibility of what actually constitutes the service provider identity (other than a description of the service provider identity). From the customer or tenant perspective (hereinafter referred to interchangeably as "tenant") the tenant is only required to approve and revalidate which roles of the service provider, as a whole has access to, and not on an individual by individual basis. Limiting the number of revalidations is particularly useful when the service providers themselves are organized consist of large groups of individuals, cutting down on the number of revalidations needed and in turn improving the overall efficiency and security of a multi-tenant network by reducing application and revalidation redundancy significantly.

From the service provider's prospective, the service provider identity is only required to revalidate the individuals and groups that form the service provider identity. Treating the service provider as a single identity is distinctly different from group based RBAC, wherein in group based RBAC, the tenant managers and customers still view the group as a collection of individual user and not a single, unified service provider with a single identity on the RBAC system. A tenant manager or customer granting access to an individual user of the group of individuals in group based RBAC is able to identity which member of the group is accessing resources of the tenant of the multi-tenant network. Instead, using the RBAC system described herein, the individual user performing the action using the service provider identity is abstracted from the tenant, tenant manager or customer.

In this manner, the embodiments of the identity management tools and methods described in this disclosure may abstract individual users from the tenant as well as the tenant from the individual users. The tenant managers no longer become concerned with assigning roles to individual users of each service provider identity, but rather select the appropriate service provider identity that suits the tenants' needs based on the description of the service provider and the services the service provider identity offers. Accordingly, the tenant will rely on the individual service provider identity to police and maintain the individuals users allowed to be part of the service provider identity.

Referring to the drawings, FIG. 1 is a depiction of an embodiment of an identity management system capable of applying RBAC identity management tools and methods for abstracting individual users from role memberships. The embodiment of the identity management system may include nodes 5a . . . 5n connected through a network 7 to a computing system 14. There are not any limitations of the number of nodes that may be connected to the network 7, rather nodes 5a, 5b, 5c . . . 5n are meant to demonstrate that a plurality of one or more nodes may be connected to the network 7. Network 7 may include any type of network including, inter alia, a local area network, (LAN), a wide area network (WAN), the Internet, a wireless network, etc. Nodes 5a . . . 5n may include any type of computing system(s) including, inter alia, a computer (PC), a laptop computer, a tablet computer, a server, a PDA, a smart phone, etc. Computing system 14 may include any type of computing system(s) including, inter alia, a computer (PC), a laptop computer, a tablet computer, a server, etc. Computing system 14 includes a memory system 8. Memory system 8 may include a single memory system. Alternatively, memory system 8 may include a plurality of memory systems. Memory system 8 includes software 17 comprising computer programming code for RBAC identity management tools implementing methods for abstracting individual users from role membership in the identity management system.

Figure 2:
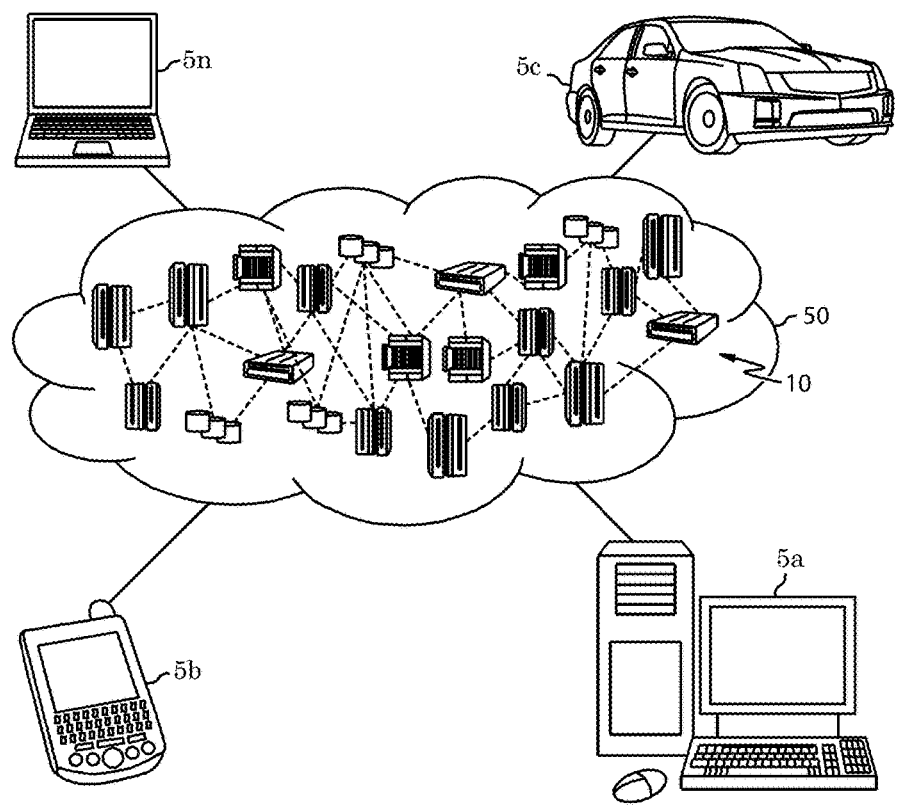
FIG. 2 depicts a cloud computing environment for implementing embodiments of the present invention.

In some embodiments, the computer network 7 may be a multi-tenanted network, such as a cloud computing network operating under a cloud computing environment 50, as shown in FIG. 2. Cloud computing may be referred to as a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Embodiments of a cloud computing model may include one or more of at least five characteristics, at least three service models, and at least four deployment models.

Characteristics of a cloud computing environment may include on-demand self-service, broad network access, resource pooling, rapid elasticity and measured service. The term "on-demand self-service" may refer to a characteristic of a cloud computing environment that may allow a tenant of the cloud environment to unilaterally provision computing capabilities, such as server time and network storage, as needed, automatically without requiring human interaction with the owner of the cloud environment.

"Broad network access" may refer to the capabilities available over the network which may be accessed through standard mechanisms that promote use by heterogeneous thin or thick client platforms (e.g., mobile phones, laptops, and PDAs).

"Resource pooling" may refer to the tenant's computing resources being pooled to serve multiple tenants using a multi-tenant model, with different physical and virtual resources dynamically assigned and reassigned according to demand. There is a sense of location independence in that the tenant may generally have no control or knowledge over the exact location of the provided resources but may be able to specify location at a higher level of abstraction (e.g., country, state, or datacenter).

"Rapid elasticity" refers to capabilities of the cloud network to rapidly and elastically provision, in some cases automatically, to quickly scale out and rapidly released to quickly scale in. To the tenant, the capabilities available for provisioning may appear to be unlimited and can be purchased in any quantity at any time.

"Measured service" may refer to cloud systems being able automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The service models for a cloud computing environment may include Software as a Service (SaaS), Platform as a Service (PaaS) and Infrastructure as a Service (IaaS). Software as a Service (SaaS) refers to the capability provided to the tenant to use the service provider's applications running on a cloud infrastructure. The applications are accessible from various client devices through a thin client interface such as a web browser (e.g., web-based e-mail). The tenant does not manage or control the underlying cloud infrastructure including network, servers, operating systems, storage, or even individual application capabilities, with the possible exception of limited user-specific application configuration settings.

Platform as a Service (PaaS) refers to the capability provided to the consumer to deploy onto the cloud infrastructure tenant-created or acquired applications created using programming languages and tools supported by one or more service providers. The tenant does not manage or control the underlying cloud infrastructure including networks, servers, operating systems, or storage, but has control over the deployed applications and possibly application hosting environment configurations. In contrast, Infrastructure as a Service (IaaS) refers to the capability provided to the tenant to provision processing, storage, networks, and other fundamental computing resources where the consumer is able to deploy and run arbitrary software, which can include operating systems and applications. The tenant does not manage or control the underlying cloud infrastructure but has control over operating systems, storage, deployed applications, and possibly limited control of select networking components (e.g., host firewalls).

Deployment models of a cloud computing environment such as the one depicted in FIG. 2 may include a private cloud, community cloud, public cloud or hybrid cloud. A "private cloud" refers to cloud infrastructure that is operated solely for an organization. It may be managed by the organization or a third party and may exist on-premises or off-premises. A "community cloud" may refer to cloud infrastructure is shared by several organizations and supports a specific community that has shared concerns (e.g., mission, security requirements, policy, and compliance considerations). It may be managed by the organizations or a third party and may exist on-premises or off-premises.

A "public cloud" deployment model may refer to cloud infrastructure that is made available to the general public or a large industry group and is owned by an organization selling cloud services to one or more tenants. A "hybrid cloud" may refer to cloud infrastructure that is a composition of two or more clouds (private, community, or public) that remain unique entities but are bound together by standardized or proprietary technology that enables data and application portability (e.g., cloud bursting for load-balancing between clouds).

Figure 3:
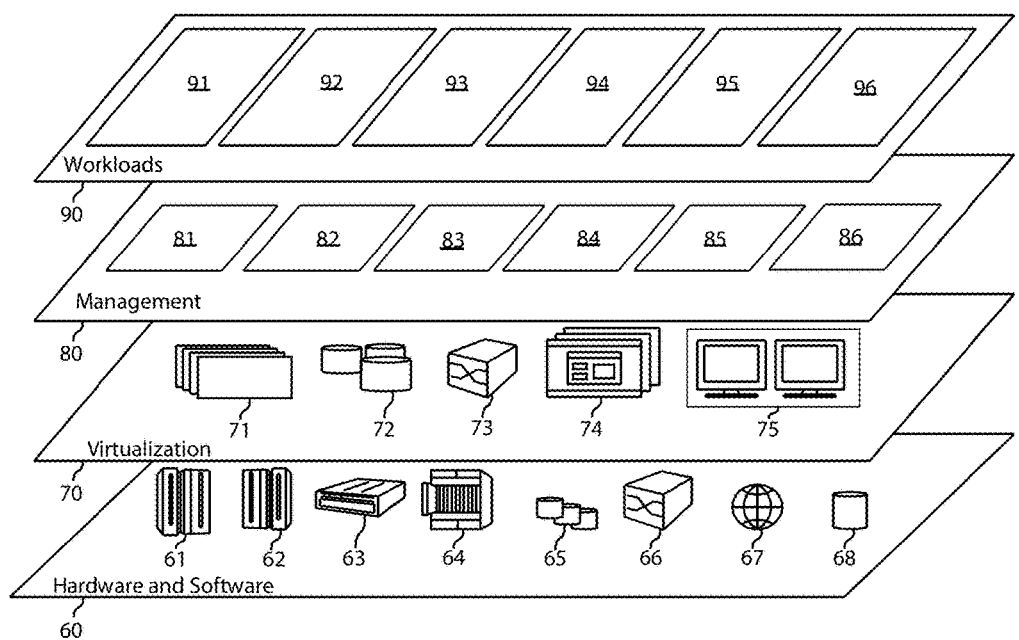
FIG. 3 depicts abstraction model layers of a cloud computing environment implementing embodiments of the present invention.

A cloud computing environment may be considered service oriented with a focus on statelessness, low coupling, modularity, and semantic interoperability. At the heart of cloud computing environment may be an infrastructure comprising a network of interconnected nodes. Referring now to FIG. 3, illustrating an embodiment of a cloud computing environment 50, the cloud computing environment 50 may comprise one or more cloud computing nodes 10 with which local computing devices used by cloud tenants and/or services providers connected to the cloud computing environment. The computing nodes 10 may include for example, desktop computer 5a, personal digital assistant (PDA) or cellular telephone 5b, automobile computer system 5c, and/or laptop computer 5n. Nodes 10 may communicate with one another. They may be grouped (not shown) physically or virtually, in one or more networks, such as Private, Community, Public, or Hybrid cloud environment as described hereinabove, or a combination thereof. This allows cloud computing environment 50 to offer infrastructure, platforms and/or software as services for which a cloud consumer does not need to maintain resources on a local computing device. It is understood that the types of computing devices 5a-n shown in FIG. 2-3 are intended to be illustrative only and that computing nodes 10 and cloud computing environment 50 can communicate with any type of computerized device, such as the computer system 690 depicted in FIG. 6 (described below), over any type of network and/or network addressable connection (e.g., using a web browser).

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosed invention are not limited thereto. As depicted, the following layers and corresponding functions are described further below.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

The management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Identity verification 86 verifies the permission granted to customers and/or service providers to access to network based resources and perform tasks in the cloud based environment 50.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and security 96.

In the present disclosure, the security workload 96 may include identity management tools and applications for implementing RBAC security measures within the cloud computing environment 50. The security workload 96 of the workload layer 90 may operate in conjunction with and alongside the identity verification 86 of the management layer 80. The RBAC identity management tools of the security workload may include programming code implementing methods for abstracting users from the role membership of the RBAC, resulting in security measures that are simplified and streamlined for large scale service providers who utilize the multi-tenant cloud environments. The RBAC identity management tools and methods for abstracting users from role membership of the disclosed application may reduce the amount of resources utilized for implementing security 96 in the cloud computing environment or other multi-tenant networks, due to no longer necessitating revalidation of individual users accessing the cloud environment, but rather grouping users into service provider identity and treating service provider identity as a single entity (as further described below).

Figure 4A:
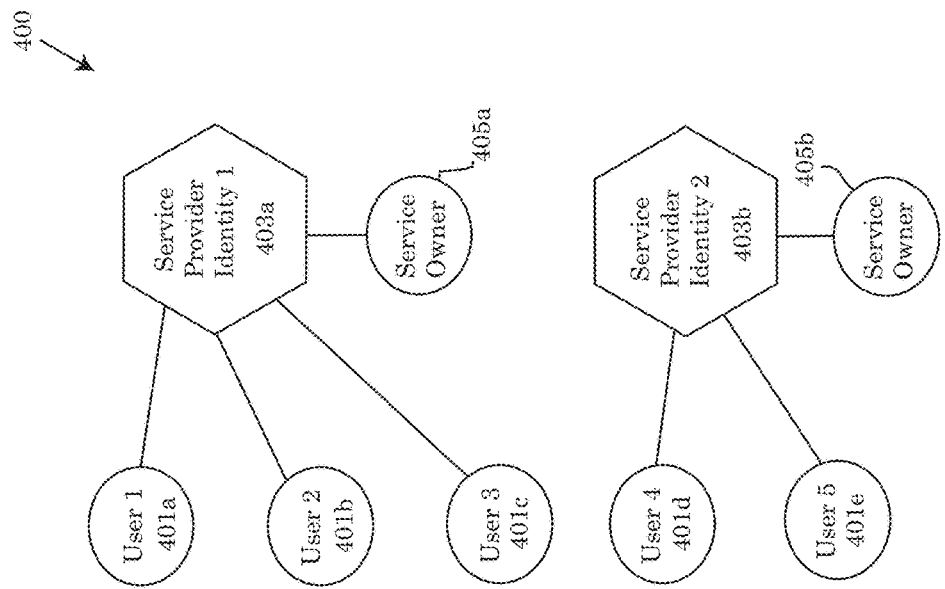
FIG. 4a depicts a flow chart of an identity management system depicting individual and groups of users as part of a service provider identity.
Figure 4B:
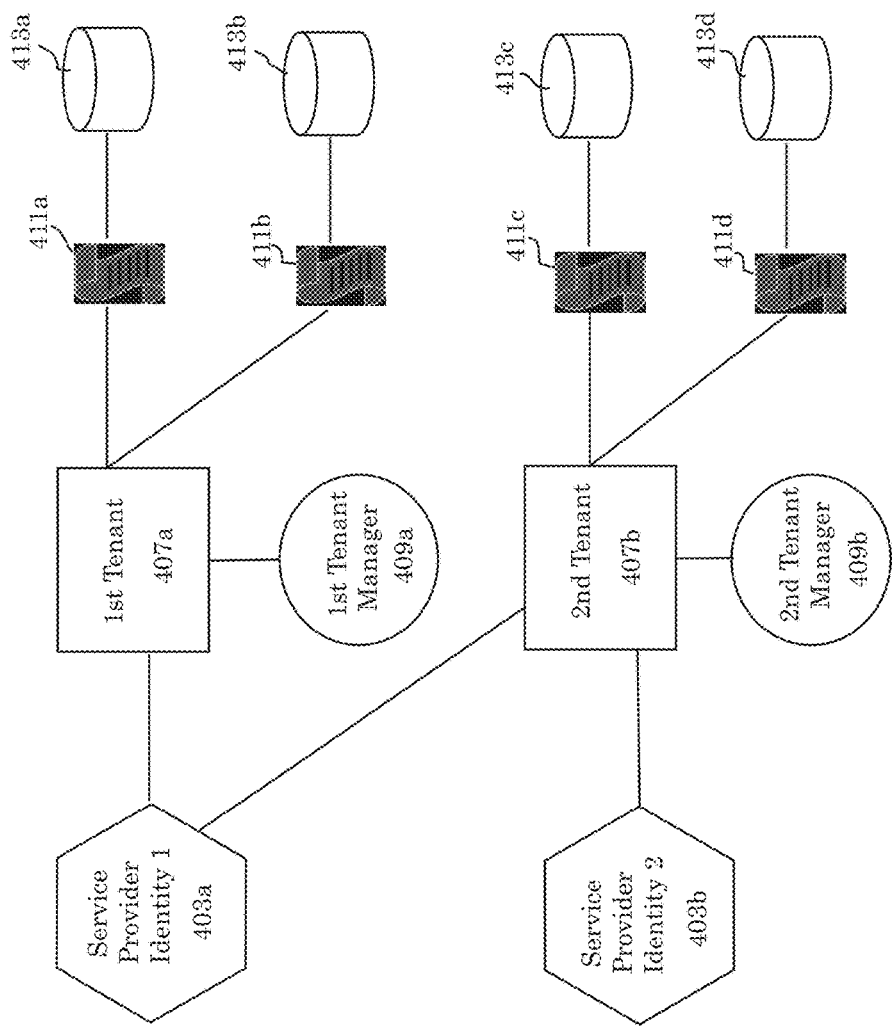
FIG. 4b depicts a flow chart of an identity management system abstracting individual users and groups of users from tenant managers assigning role memberships.

FIGS. 4a and 4b illustrates a flow chart describing an embodiment 400 of an RBAC identity management tool that may operate as part of the embodiments of the identity management system, such as the network system depicted in FIG. 1 or the multi-tenant systems depicted in FIGS. 2 and 3. The RBAC identity management tools may include software 17 loaded into the memory system 8 of one or more computing systems 14 available as individual nodes 5a to 5n or cloud nodes 10 on the network 7, including cloud network 50 respectively.

In other embodiments, the RBAC identity management tools may include programming code loaded in the memory of the underlying physical or virtual hardware of the network 7, including cloud network 50 infrastructure such as the mainframe 61, RISC architecture based server 62, servers 63, blade servers 64, storage device 65 or networking components 66, virtual infrastructure such as virtual server 71, virtual storage 72, virtual network 73, virtual operating system 74 or virtual clients 75 of a multi-tenant cloud network 50. In some embodiments, the identity management tools may be integrated into the network application server software 67 or the database software 68.

In other embodiments, the RBAC identity management tools may be coded directly into specialized hardware of the computing network, such as specialized nodes having specialized circuitry, firmware or bios loaded with the RBAC identity management tools to restrict or control access to the computing network and the network's secured resources. In some embodiments, the RBAC identity management tools may be loaded into read only memory (ROM) or EPROM of one or more individual nodes 5a-5n, cloud nodes 10 or hardware of the identity management system, including the networked hardware, such as multi-tenant cloud based hardware, for example mainframe 61, RISC architecture based servers 62, servers 63, blade servers 64, storage devices 65 or networking components 66.

Referring back to FIG. 4a, one or more users 401a, 401b, 401c, 401d, 401e (referred to collectively as "users 401") may access the network 7 from one or more nodes 5a to 5n. Although the embodiment depicted in FIG. 4a only demonstrates the presence of five users, the number of users with access to the network 7 is potentially limitless and may only be limited based on the capabilities of the network hardware or virtual hardware to handle large numbers of users. As stated above, multi-tenant networks, such as the cloud network environment 50 may actively support hundreds of thousands, or more users.

As shown in FIG. 4a and FIG. 4b, the RBAC identity management tools of the identity management systems may provide access to each of the users 401 functioning as part of the service provider identity, while simultaneously abstracting the users from each of the plurality of tenants 407a, 407b and the tenant managers 409a, 409b of a multi-tenant network. As shown by the representation of FIG. 4a and FIG. 4b as separate flowcharts, the approval of users to be part of the service provider identity (shown in FIG. 4a) is a distinctly separate sub-process from the sub-process shown in FIG. 4b, wherein each service provider identity applies for role memberships from one or more tenants, and the unified service provider identity is the portion visible to each of the tenants and customers.

While the figures only depict two tenants and a corresponding tenant manager for each tenant, the number of tenants, much like the number of users 401, may be limitless due to the advancements in the underlying hardware and virtualization techniques of multi-tenant networks and cloud computing infrastructure. The term "tenant" 407a, 407b may refer to one or more virtual partitions on a multi-tenant network and/or leased from the owner of the network or an issuer of a cloud. A "tenant manager" may be the issuer or administrator of one or more services or applications on a multi-tenant network. The tenant manager may be considered the owner of the resources and data associated with each tenant, or the tenant manager may be administrator hired by the data owner to secure the data from unauthorized access.

The RBAC identity management tools prevent unauthorized access to the resources 413a, 413b, 413c, 413d (collectively referred to as resources 413) of the underlying the tenants of the multi-tenant network. An identity management system employing the RBAC identity management tools may require users 401 to be approved for a particular role and receive permissions by the tenant manager, granting the users access to specified resources (413) of the multi-tenant network. The permissions may be manually generated by the tenant managers or the permissions may be created and updated through a dynamic permissions policy. The term "resources" may include any physical or virtual component of a computing system, including every component (internal or external), files, data objects, databases, network bandwidth, memory devices, processing power, electrical power, or I/O operations. Certain roles may have access to only specific resources or functions of the network. Often, access to secured resources 413 may be provided to specific roles of the network based on need. For instance, a software developer hired by a tenant manager may have read and write access to the source code of an application run within tenant, whereas an accounting service provider may not need to read and write at the source code level, but rather requires access to a secured database storing financial information.

Embodiments of the RBAC identity management tools abstract the users 401 from the view of tenant managers 409a, 409b by not having users make direct requests for access to tenant manager of a role, distinctly represented by the separation of users from FIG. 4b. Instead, the RBAC identity management tools organizes the individual users or groups of users 401 into a service provider identity 403a, 403b having a unified presence whereby a user 401 requests to be included into a service provider identity 403a, 403b that has access to the roles of the tenant. The service provider identity applies to be included as part of the dataset for each eligible role that the service provider identity qualifies. Consequently, once the service provider identity is approved, each user included in the service provider identity dataset receives access to the resources of the role, for as long as they are accessing the multi-tenant network as the service provider identity.

The service provider identity 403a, 403b may be individually managed by an owner or manager 405a, 405b of the service provider identity. Requests for membership to the service provider identity may be sent to the service provider identity owner or manager by the individual user. Based on the requests, and the eligibility of the users 401 making the request, the owner or manager 405a, 405b may input data by executing administrative commands such as the AddUser command, to admit the particular user to the service provider identity 403a, 403b by adding the user to the service provider identity data set. The service provider identity owner may deny a particular user and refuse to AddUser to the service provider identity data set, thus denying the user request. Accordingly, the inclusion of each individual user to a service provider identity data set may be a function of the input data of the service provider identity owner 405a, 405b into the RBAC identity management tool, instructing the RBAC identity management tools to add or remove users as needed.

Controlling the individual users of the service provider identity by the service provider owner 405a, 405b rather than the tenant managers, improves efficiency and security when it comes to adding or deleing individual users from service provider identity dataset. Often, individual users 401 of the service provider identity 403a, 403b may be affiliated or personally well known to the service provider owner or manager 405a, 405b. For example, the users of the service provider identity may be employees, contractors, co-workers, or other personnel hired by the service provider to perform a job function or task of the service provider, whereas a tenant manager may have never personally met or worked with an individual user before a request for access to a role is made. In the current embodiments, the determination of whether or not an individual user belongs in the service provider identity dataset may be verified by the owner or manager 405a, 405b by reviewing the individual user's current state of employment, job title, and responsibilities within the service provider identity. Often, the service provider identity may be close knit teams of employees, which may make it easier for a group owner or manager 405a, 405b to identify whether or not an individual user 401 belongs within the service provider identity dataset.

As shown in FIG. 4a and FIG. 4b, each individual user 401 does not directly apply for a role created by a tenant manager. The individual user is not even identifiable to the tenant managers. Instead, the service provider identity is treated as a single unified entity when the service provider applies for one or more roles created by the tenant managers 409a, 409b for each individual tenant of the multi-tenant network. In some embodiments, the service provider identity may apply for a plurality of roles with a plurality of tenants 407a, 407b.

As shown in the example of FIG. 4b, the service provider identity 403a is approved for roles with both the $1^{st}$ tenant 407a and the $2^{nd}$ tenant 407b, while the second service provider identity 403b has only been approved for a role by the $2^{nd}$ tenant 407b. This exemplary embodiment is simply for illustration. A multi-tenant network may have hundred, thousands or more tenants, each with a plurality of approved service providers for each tenant.

When the application is made by the service provider identity 403a, 403b to the tenant, the tenant manager 409a, 409b treats the service provider identity as a single entity. The inclusion of the service provider identity dataset in the role dataset may be a function of the tenant manager's input data into the RBAC identity management tools. In some embodiments, the tenant manager's input data may include a tenant manager executing an administrative command adding the service provider identity dataset to one or more role datasets that have been granted permission to perform an operation on an object or other secured resource by that role.

The RBAC identity management tools have simplified the role assignment process by making individual user assignments by the tenant managers 409a, 409b obsolete. Each of tenant managers 409a, 409b assigning roles to a service provider identity data set relies on the group owner 405a, 405b to maintain the data set with the appropriate user memberships within the service provider identity, while the tenant mangers determine whether or not the service provider is worthy of being granted membership to the roles having permissions to access the appropriate secured resources 413. Accordingly, a service provider identity dataset may be consistently updated to replace a previous dataset without requiring a tenant manager to make a subsequent approval of the updated service provider identity dataset into the role dataset. A service provider owner may dynamically keep the users currently active within a service group up to date as the service provider expands, hires, contracts or even loses employees who may be the individual user so of the service provider identity.

In some embodiments, each service provider identity may apply for multiple roles within a single tenant, and/or a service provider identity may receive approval for roles created by separate and independent tenant managers. For example, suppose the $1^{st}$ service provider identity 403a and the $2^{nd}$ service provider identity each provides a separate and distinct service to the $2^{nd}$ tenant 407b. For instance service provider identity 403a may be a technical support group offering technical assistance to the tenant's customers, while service provider identity 403b may offer mapping and location services to the tenant's customers. These separate and distinct service groups may apply for and receive approval from the tenant manager 407b for different roles, or possibly the same roles depending on the needs of the service provider to service the customers.

In an embodiment where each service provider identity has access to different roles to fulfill their duties, the roles corresponding to fulfilling the duties of the $1^{st}$ service provider identity 403a may include granting permission 411c to access secured resources of 413c, whereas service provider identity 403b receives permission 411d to access secured resource 413d. In this example, the roles may actually have access to separate and distinct resources. "Permissions" may refer to the authorization given to members of a service provider identity to access resource objects (e.g. a database) or perform functions on the resources (read only or read/write).

In other embodiments, the roles and the role's associated permissions to access resources or functions granted to the service provider identity may overlap depending on the task entrusted to the service provider identity. For instance a service provider identity 403a may apply for role that provides permissions 411c, 411d to access resources 413c and 413d, whereas service provider identity 403b has a role that the tenant owner 409b has determined does not require access to permission 411d and therefore the approved role for service provider identity 403b only offers permission 411c to access resource 413c.

Using embodiments of the RBAC identity management tools described herein, the service provider owners 405a, 405b may dynamically add or remove members to the service provider identity data set as a function of the group owners input data into the RBAC identity management tools, using administrative commands such as AddUser or DeleteUser, without burdening the tenant owners 409a, 409b with having to approve each change occurring. This allows for service provider identity to dynamically expand or contract the number of users 401 that are part of the service provider identity dataset having access to a particular role and resources, without increasing the administrative burden on each tenant manager of the multi-tenant network to approve each individual user every time there is an update. Instead, group owners 405a,405b, which may be more familiar with the service group provider's inner workings, hiring practices, business model and team members being added or removed, may easily adjust members of the service provider identity without the tenant managers even having to know there has been a change in users.

On the tenant side of the multi-tenant network, the tenant managers may only be aware that the services are continuously being provided, as negotiated or contracted for with the service provider identity. As such, the tenant manager is may only be aware that the services of the service provider are being rendered by the service provider identity, but it may not necessarily be known to the tenant manager which individual users of a service provider identity dataset will be providing or accessing the secured resources permitted by the assigned role.

In some instances, abstracting the users from service provider identity entity may be beneficial for simplifying the services provided to customers of the tenants. Selecting a service provider identity from the customer prospective, based on the services offered, rather than by selecting an individual user to offer the services, may make it easier for a customer of the tenant to select the appropriate services. A plurality of service provider identity may belong to the same company, but the organization structure of the company may provide services of the service provider identity according to particular criteria such as location, or services rendered.

For example, suppose each service provider identity 403a and 403b both belong to a company that offers technical support to the customers of the $2^{nd}$ tenant 407b. However, service provider identity 403a provides technical assistance to customers of the tenant 407b located in the United States, whereas service provider group 403b provides technical assistance to customers of the tenant in another country. Under this situation, service provider 403a may be provided resources through the role assignments necessary to communicate and assist US customers, while service provider identity 403b receives a separate role assignment granting access to resources (such as customer databases and account information) allowing for the service provider identity 403b to assist customers in non-US country. Accordingly, in some embodiments, a customer of the tenant operating in the US may identify their location to the network and this location identification information may automatically tie them to receiving the local support services from the US service provider identity 403a instead of the services from the non-US technical support group. In other embodiments, the customer may select the service provider identity of their choice manually.

Periodically, a tenant owner 409a, 409b may perform revalidation of the role assignments for each service provider identity of the identity management system by inputting data and transmitting instructions to the RBAC identity management tools, approving or disapproving of the current role assignments. The identity management tools may simplify and streamline the tenant owner's revalidations of the roles and the dataset associated with each role by only necessitating that the roles be revalidated for each service provider identity as a whole and not a revalidation of specific individual users.

During the step of revalidation, the tenant manager may evaluate one or more specific criteria to determine whether the service provider identity should be reassigned to the role dataset that the service provider identity is currently enlisted. Examples of the criteria that may be evaluated by tenant manager may include, but is not limited to, an evaluation of whether or not the roles that a service provider is a member of still exist, whether the service provider identity's role has changed or been updated, whether or not the service provider identity still requires access to one or more of the secured resources of the role, and whether or not a service provider contract has expired, been re-negotiated or renewed. For instance, if a service provider identity offered services was contractually obligated to provide a service to the customers of the tenant, but subsequently the service contract has expired and not been renewed, the RBAC identity management tools may revoke membership of the specific service provider identity to their previously authorized role, as a function of the tenant manager's input instructing the revocation.

During the revalidation, the tenant manager may input one or more commands into the RBAC identity management system and the action taken by the RBAC tools may be a function of the tenant manager's instructions. These commands may be directed toward the permissions of the roles themselves, such as the GrantPermission or RevokePermission command, or the commands may be directed to the service provider identity, such as the Assign or Deassign command which may add or remove a service provider identity dataset from the role dataset.

Figure 5:
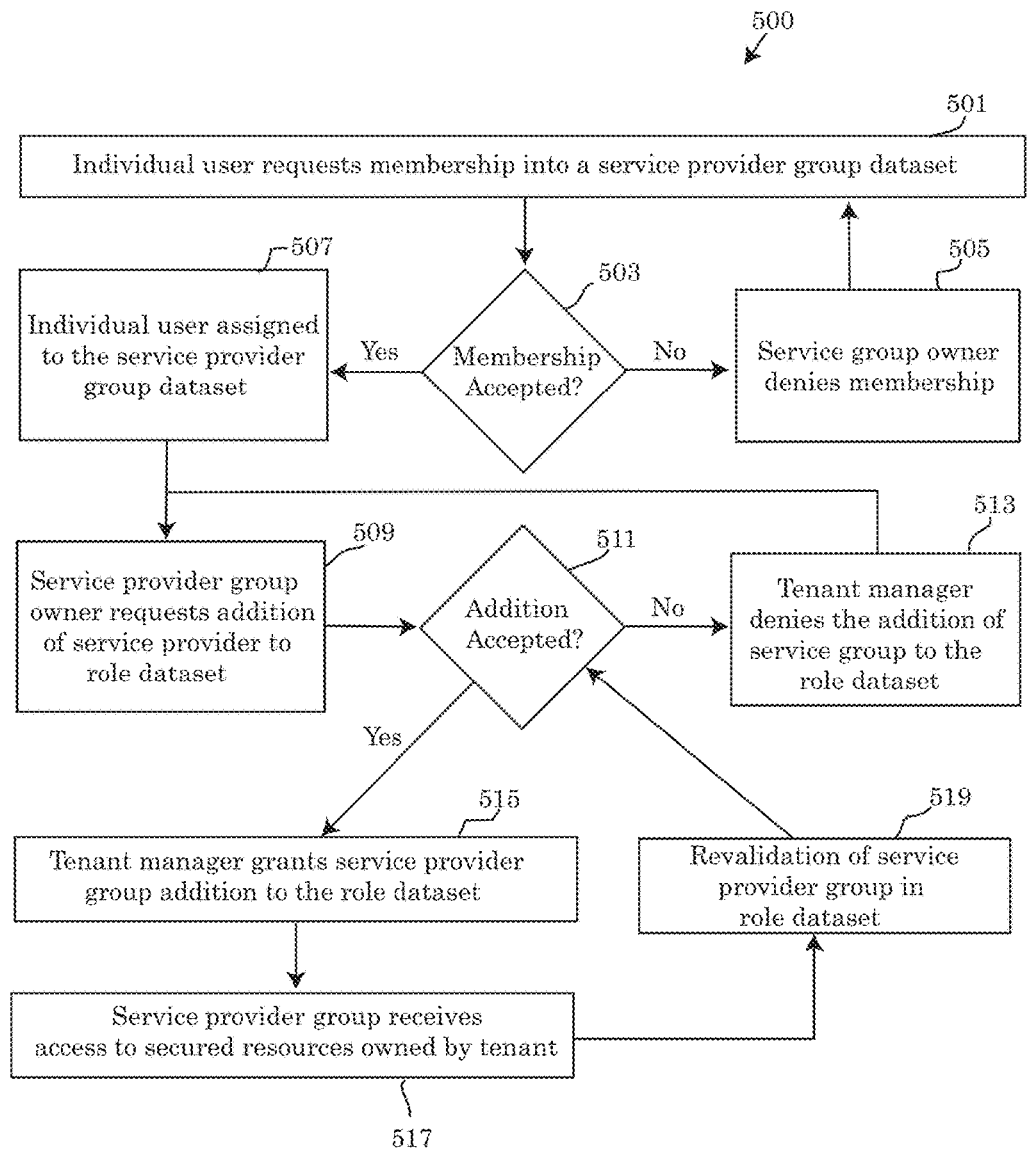
FIG. 5 depicts a flow chart illustrating an embodiment of an algorithm detailing a process for abstracting individual users from RBAC role membership.

Referring to the embodiment 500 of FIG. 5, in step 501, an individual user 401 may request membership to a service provider identity 403 dataset using the RBAC identity management tools of the identity management system operating. The request may be made by the user at one of the nodes 5a-5n operating on the network 7, including one or more nodes where the RBAC identity management tools may be part of a multi-tenant cloud environment 50 as described above.

In step 503, a decision is made by the RBAC identity management tools as a function of the input data and commands transmitted by the service group owner or manager 405 instructing the RBAC identity management tools whether or not to accept the individual user request. In step 505, the RBAC identity management tools receiving the data input from the service group owner or manager may deny the individual user membership into the service provider identity 403 dataset. This step may be performed by the RBAC identity management system when the group owner 405 refuses to input the AssignUser command which would place the user in the service provider identity dataset. Possible reasons for the denial may include: the individual does not perform the tasks or services associated with the service provider identity applied for, or the individual user may no longer perform duties associated with the service provider. When a denial occurs, an individual user 401 may attempt to reapply for a different service provider identity (if available) or may reapply to be part of the service provider identity dataset at a later date.

If however, the input data of the service provider owner instructs the RBAC identity management tools in step 503 accept the membership request of the individual user 401 to the service provider identity 403, the RBAC identity management tools may assign the individual user to the requested service provider identity dataset. Each of the individual users 401 may be assigned to the requested service provider identity dataset as a function of the input data of the service provider owner, who may be manually approve each user request in some embodiments. This may occur by the service provider owner inputting an administrative command such as AssignUser or AddUser.

In alternative embodiments, the request may be granted automatically by the RBAC identity management tools. For example, the RBAC identity management tools may have access to one or more database records of all existing employees, contractors, job titles, and/or role of employment with the service provider. The RBAC identity management tools may be instructed via program code, to cross check the names, job title or employment responsibilities of the individual users making application with the employment records. Subsequently if the employment records confirm sufficient criteria has been met to for including the individual user in the service provider identity, the RBAC identity management tools may be instructed to grant access to the service provider identity automatically.

Subsequently, in step 509, the owner or manager 405 of the service provider identity may request to be added to one or more roles created by a tenant manager of each tenant in a multi-tenant network. The service provider owner 405 may request that the tenant manager add the service provider identity dataset to a role specific dataset. In step 511, each of the tenant managers receiving a request from the service provider owner, may respond to each request by inputting data into the RBAC identity management tools instructing the RBAC identity management whether or not the service provider identity will be added to the requested role datasets.

In step 513, the service provider owner's request may be denied as a function of the input data provided by the tenant manager 407. Reasons for the member denial may be numerous and may include reasons such that the service provider identity does not perform services that require access to the resources granted by the requested role, or a the role requested has been deleted or altered by the tenant manager and thus no longer exist or are not applicable to the service provider identity making the request. In some embodiments, the denial may occur simply because a service provider identity has applied for a role that may not be suited to the services. In the event of a denied request, the service provider identity may still make one or more subsequent requests to be added to the appropriate role dataset.

If however, the tenant owner has determined that the role requested by the service provider identity is appropriate, in step 515 the tenant manager may grant the service provider identity's request to be added to the role data set and grant permissions to the service provider identity. Step 515 may be performed as a function of the input data of the tenant manager 409 wherein the tenant manager 409 transmits one or more administrative commands instructing the RBAC identity management tools to add the service provider identity dataset to the role dataset. By virtue of the service provider identity dataset being added to role dataset, each of the individual users listed in the service provider identity dataset may be authorized to receive the permissions associated with the particular role.

Upon the addition of the service provider identity dataset to the role dataset, in step 517 the service provider identity may receive access to one or more secured resources, in accordance with the permissions granted to the role via the role dataset. Accordingly, every individual user that is included in the service provider identity dataset may be granted the permissions to access the secured resources associated with the role that the service provider identity is a member of.

Accordingly, the service provider owner 405, may dynamically execute commands to AddUser or DeleteUser from the service provider identity dataset, thereby updating the service provider identity dataset as a function of the input data of the service provider identity owner. As the service provider owner adds and deletes individual users, the service provider owner 405 may expand or reduce the number of individual users having access to a secured resource of a tenant 407 through the role dataset, without having to re-request replacing the previous service provider identity dataset with an updated service provider identity dataset. In some embodiments, as the service provider owner updates the service provider identity dataset, each of the individual users of the service group dataset become part of the role dataset, and by virtue of this inclusion, each individual user receives permissions to access secured resources of the tenant. Therefore, the service provider identity can continuously update and change the service provider identity dataset improving the accuracy of the individual members having access to a role, without constantly having to receive approval from the tenant manager 409.

In some embodiments, instead of constantly requiring the tenant managers 409 to update the role dataset every time there is a change to the service provider identity dataset, embodiments of the RBAC identity management system in step 519 may allow for tenant managers 409 to periodically revalidate the role assignments of each service provider identity at a less frequent intervals than the intervals a service group owner updates the service provider identity dataset.

In order to revalidate the membership of a service provider identity to a specific role, embodiments of the RBAC identity management system may determine whether or not the role assignments meet the requirements of the service provider identity to perform contracted functions, tasks or services to the tenant, wherein the revalidation of the role membership may be based on one or more requirements of the service group to perform certain functions or tasks, independently and regardless of the individual users that comprise the service provider identity itself. If, it is determined by the RBAC identity management system, based on the input from the tenant manager 409, that the current role membership and the role's granted permissions are still appropriate for the service provider identity, the tenant manager may revalidate the service provider identity's membership as part of the role dataset.

On the other hand, under certain circumstance, the RBAC identity management tools may make a determination based on the input instructions from the tenant manager, that the assigned role of the service provider identity to the role dataset is inappropriate. In this situation, the tenant manager 407 may input a command to the RBAC identity management tools to deassign the service group dataset from the role dataset, delete the role, amend the role by revoking permissions or granting new permissions, adding new roles and assigning the service group thereto, or a combination of actions. The tenant manager may perform these steps using RBAC commands such as DeleteRole, AddRole, Deassign, Assign, GrantPermission and/or RevokePermission. For example, a tenant manager may delete a role when the purpose of the role is no longer suited to perform a specific job or task, or the secured resource accessible through the role's permissions no longer exists. In some embodiments, a role may be determined to be outdated and require an update to the permissions to allow for updated resources to be accessible by the service provider identity. In other examples, a new role may be added and a service group may be deassigned from the current role and simultaneously reassigned to a new role because the new role is better equipped with access to the resources of the multi-tenant network that are better suited to perform the tasks of the service provider identity. The steps of revalidation may be performed at regular, semi-regular or even sporadic intervals by the tenant manager. The revalidation steps may be performed automatically in accordance with a pre-programmed schedule of the RBAC identity management system, or the revalidation may be inputted manually by the tenant manager.

Figure 6:
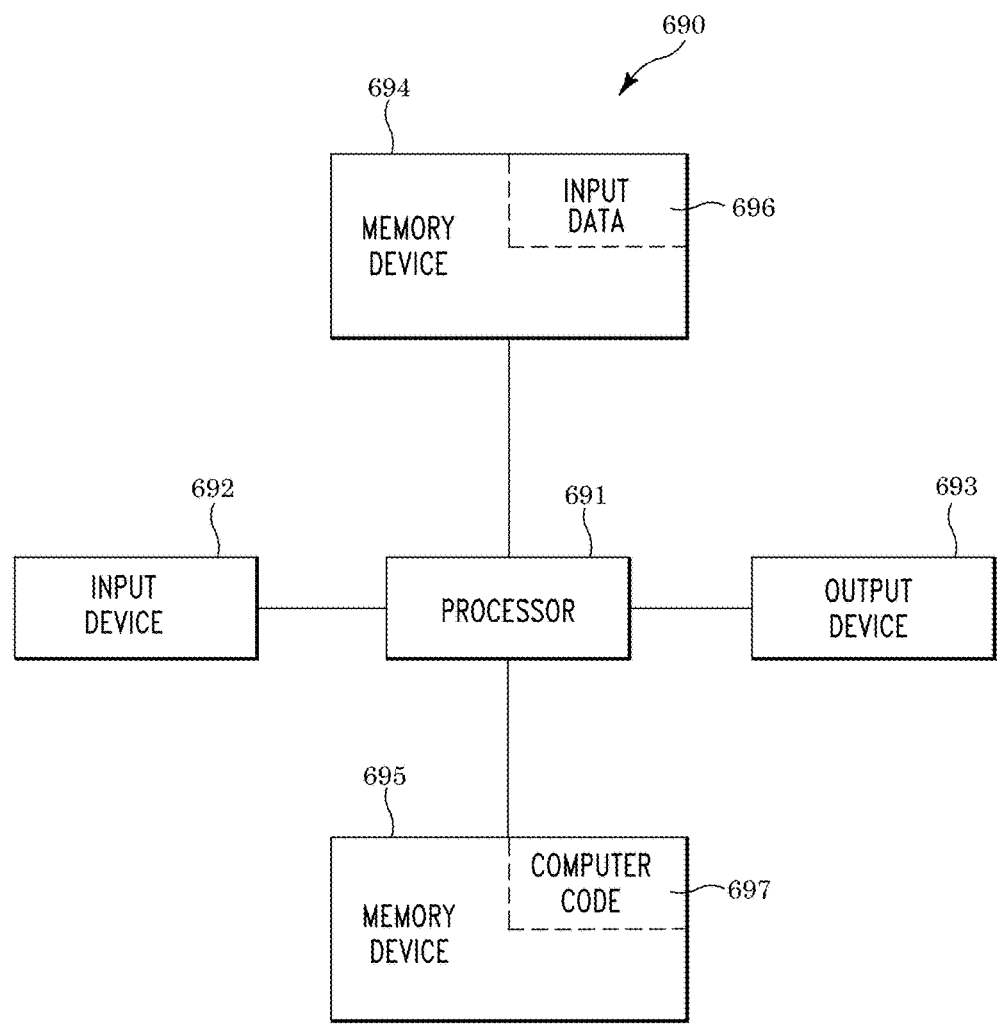
FIG. 6 illustrates an embodiment of a computer used for abstracting individuals from RBAC role membership, in accordance with embodiments of the present invention.

FIG. 6 illustrates a computer system 690 used for abstracting individual users from RBAC role membership, in accordance with embodiments of the present invention. The computer system 690 comprises a processor 691, an input device 692 coupled to the processor 691, an output device 693 coupled to the processor 691, and memory devices 694 and 695 each coupled to the processor 691. The input device 692 may be, inter alia, a keyboard, a mouse, etc. The output device 693 may be, inter alia, a printer, a plotter, a computer screen, a magnetic tape, a removable hard disk, a floppy disk, etc. The memory devices 694 and 695 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 695 includes a computer code 697 which is a computer program that comprises computer-executable instructions. The computer code 697 includes software or program instructions that may implement an algorithm for abstracting individuals from RBAC role membership. The processor 691 executes the computer code 697. The memory device 694 includes input data 696. The input data 696 includes input required by the computer code 697. The output device 693 displays output from the computer code 697. Either or both memory devices 694 and 695 (or one or more additional memory devices not shown in FIG. 6) may be used as a computer usable storage medium (or program storage device) having a computer readable program embodied therein and/or having other data stored therein, wherein the computer readable program comprises the computer code 697. Generally, a computer program product (or, alternatively, an article of manufacture) of the computer system 690 may comprise said computer usable storage medium (or said program storage device).

Thus the present invention discloses a process for supporting, deploying and/or integrating computer infrastructure, integrating, hosting, maintaining, and deploying computer-readable code into the computer system 690, wherein the code in combination with the computer system 690 is capable of performing a method for abstracting individual users from RBAC role membership.

While FIG. 6 shows the computer system 690 as a particular configuration of hardware and software, any configuration of hardware and software, as would be known to a person of ordinary skill in the art, may be utilized for the purposes stated supra in conjunction with the particular computer system 690 of FIG. 6. For example, the memory devices 694 and 695 may be portions of a single memory device rather than separate memory devices.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for improving efficiency and security of a role based access control (RBAC) identity management system said method comprising:

assigning, by a service provider owner via one or more computer processors of the RBAC identity management system, a plurality of individual users to a service provider identity dataset;

requesting, by the service provider owner via the one or more computer processors, addition of the service provider identity dataset to a role dataset in the RBAC identity management system, wherein the role dataset comprising the added service provider identity dataset includes permissions to the individual users within the service provider identity dataset to access a secured resource of the RBAC identity management system and to perform the service on the secured resource, wherein the role dataset pertains to one or more roles pertaining to performing a service on the secured resource;

granting, by a tenant manager via the one or more computer processors, the addition of the service provider identity dataset to the role dataset, as a function of input data from the tenant manager instructing the one or more computer processors to add the service provider identity dataset to the role dataset, wherein the tenant manager owns the secured resource or is an administrator hired by an owner of the secured resource, wherein the tenant manager does not assign one or more roles to the individual users but rather assigns the one or more roles to the service provider identity dataset, wherein each individual user cannot be identified by the tenant manager, and wherein the tenant manager and the service provider owner are distinct from each other;

abstracting, from the service provider identity dataset by the one or more computer processors, the individual users being provided with said access, to the secured resource to perform the service, resulting from the service provider identity dataset having been added to the role dataset;

periodically revalidating, by the one or more computer processors, the addition of the service provider identity dataset to the role dataset, wherein said periodically revalidating comprises receiving an instruction from the tenant manager to maintain or delete the service provider identity dataset from the role dataset, wherein said access to the secured resource is based on the service provider identity dataset in the role dataset, instead of being based on the individual users, improves the efficiency and security of the RBAC identity management system; and updating, by the one or more computer processors, the service provider identity data set to an updated service provider identity dataset as a function of input received from the service provider owner, wherein the updated service provider identity dataset replaces the service provider identity dataset in the role dataset, and individual users of the updated service provider identity dataset receive the permissions to access the secured resources of the RBAC identity management system, and wherein said updating the service provider identity data set does not require the tenant manager to make, a subsequent approval of said updating.

2. The method of claim 1, wherein the RBAC identity management system is a multi-tenant network.

3. The method of claim 2, wherein the multi-tenant network is a cloud computing environment.

4. The method of claim 2, wherein said requesting specifies a plurality of requests for the service provider identity dataset to be added to one or more different role datasets.

5. The method of claim 1, wherein the permissions include read or read/write operations of the secured resource, accessible from a node of the RBAC identity management system by the individual user of the service provider identity dataset.

6. The method of claim 1, wherein said updating the service provider identity dataset occurs independently from any input by the tenant manager.

7. The method of claim 1, said method further comprising:

providing at least one support service for at least one of creating, integrating, hosting, maintaining, and deploying computer-readable program code in a computer system, where the computer-readable program code in combination with the computer system is configured to implement the steps of assigning, requesting, granting, abstracting and periodically revalidating.

8. A computer program product, comprising one or more computer readable hardware storage devices having computer readable program code stored therein, said program code containing instructions executable by one or more computer processors to implement a method for improving efficiency and security of a role based access control (RBAC) identity management system that includes the one or more computer processors, said method comprising:

assigning, by a service provider owner via the one or more computer processors of the RBAC identity management system, a plurality of individual users to a service provider identity dataset;

requesting, by the service provider owner via the one or more computer processors, addition of the service provider identity dataset to a role dataset in the RBAC identity management system, wherein the role dataset comprising the added service provider identity dataset includes permissions to the individual users within the service provider identity dataset to access a secured resource of the RBAC identity management system and to perform the service on the secured resource, wherein the role dataset pertains to one or more roles pertaining to performing a service on the secured resource;

granting, by a tenant manager via the one or more computer processors, the addition of the service provider identity dataset to the role dataset, as a function of input data from the tenant manager instructing the one or more computer processors to add the service provider identity dataset to the role dataset, wherein the tenant manager owns the secured resource or is an administrator hired by an owner of the secured resource, wherein the tenant manager does not assign one or more roles to the individual users but rather assigns the one or more roles to the service provider identity dataset, wherein each individual user cannot be identified by the tenant manager, and wherein the tenant manager and the service provider owner are distinct from each other;

abstracting, from the service provider identity dataset by the one or more computer processors, the individual users being provided with said access, to the secured resource to perform the service, resulting from the service provider identity dataset having been added to the role dataset;

periodically revalidating, by the one or more computer processors, the addition of the service provider identity dataset to the role dataset, wherein said periodically revalidating comprises receiving an instruction from the tenant manager to maintain or delete the service provider identity dataset from the role dataset, wherein said access to the secured resource is based on the service provider identity dataset in the role dataset, instead of being based on the individual users, improves the efficiency and security of the RBAC identity management system; and updating, by the one or more computer processors, the service provider identity data set to an updated service provider identity dataset as a function of input received from the service provider owner, wherein the updated service provider identity dataset replaces the service provider identity dataset in the role dataset, and individual users of the updated service provider identity dataset receive the permissions to access the secured resources of the RBAC identity management system, and wherein said updating the service provider identity data set does not require the tenant manager to make, a subsequent approval of said updating.

9. The computer program product of claim 8, wherein the RBAC identity management system is a multi-tenant network.

10. The computer program product of claim 9, wherein the multi-tenant network is a cloud computing environment.

11. The computer program product of claim 8, wherein the permissions include read or read/write operations of the secured resource, accessible from a node of the RBAC identity management system by the individual user of the service provider identity dataset.

12. The computer program product of claim 8, wherein said updating the service provider identity dataset occurs independently from any input by the tenant manager.

13. A computer system, comprising a role based access control (RBAC) identity management system that includes one or more processors, one or more memories coupled to the one or more computer processors, and one or more computer readable storage devices coupled to the one or more processors, said one or more storage devices containing program code executable by the one or more processors via one or more memories to implement a method for improving efficiency and security of the role based access control (RBAC) identity management system, said method comprising the steps of:

assigning, by a service provider owner via the one or more computer processors of the RBAC identity management system, a plurality of individual users to a service provider identity dataset;

requesting, by the service provider owner via the one or more computer processors, addition of the service provider identity dataset to a role dataset in the RBAC identity management system, wherein the role dataset comprising the added service provider identity dataset includes permissions to the individual users within the service provider identity dataset to access a secured resource of the RBAC identity management system and to perform the service on the secured resource, wherein the role dataset pertains to one or more roles pertaining to performing a service on the secured resource;

granting, by a tenant manager via the one or more computer processors, the addition of the service provider identity dataset to the role dataset, as a function of input data from the tenant manager instructing the one or more computer processors to add the service provider identity dataset to the role dataset, wherein the tenant manager owns the secured resource or is an administrator hired by an owner of the secured resource, wherein the tenant manager does not assign one or more roles to the individual users but rather assigns the one or more roles to the service provider identity dataset, wherein each individual user cannot be identified by the tenant manager, and wherein the tenant manager and the service provider owner are distinct from each other;

abstracting, from the service provider identity dataset by the one or more computer processors, the individual users being provided with said access, to the secured resource to perform the service, resulting from the service provider identity dataset having been added to the role dataset;

periodically revalidating, by the one or more computer processors, the addition of the service provider identity dataset to the role dataset, wherein said periodically revalidating comprises receiving an instruction from the tenant manager to maintain or delete the service provider identity dataset from the role dataset, wherein said access to the secured resource is based on the service provider identity dataset in the role dataset, instead of being based on the individual users, improves the efficiency and security of the RBAC identity management system; and updating, by the one or more computer processors, the service provider identity data set to an updated service provider identity dataset as a function of input received from the service provider owner, wherein the updated service provider identity dataset replaces the service provider identity dataset in the role dataset, and individual users of the updated service provider identity dataset receive the permissions to access the secured resources of the RBAC identity management system, and wherein said updating the service provider identity data set does not require the tenant manager to make, a subsequent approval of said updating.

14. The computer system of claim 13, wherein the RBAC identity management system is a multi-tenant network.

15. The computer system of claim 14, wherein the multi-tenant network is a cloud computing environment.

16. The computer system of claim 14, wherein said requesting specifies a plurality of requests for the service provider identity dataset to be added to one or more different role datasets.

17. The computer system of claim 13, wherein said updating the service provider identity dataset occurs independently from any input by the tenant manager.

* * * * *